No. 777,561. PATENTED DEC. 13, 1904.
C. B. STRAVS & J. N. JAGER.
APPARATUS FOR FORMING PIPE OR OTHER ARTICLES IN CONTINUOUS LENGTHS.
APPLICATION FILED FEB. 23, 1904.
NO MODEL. 3 SHEETS—SHEET 1.
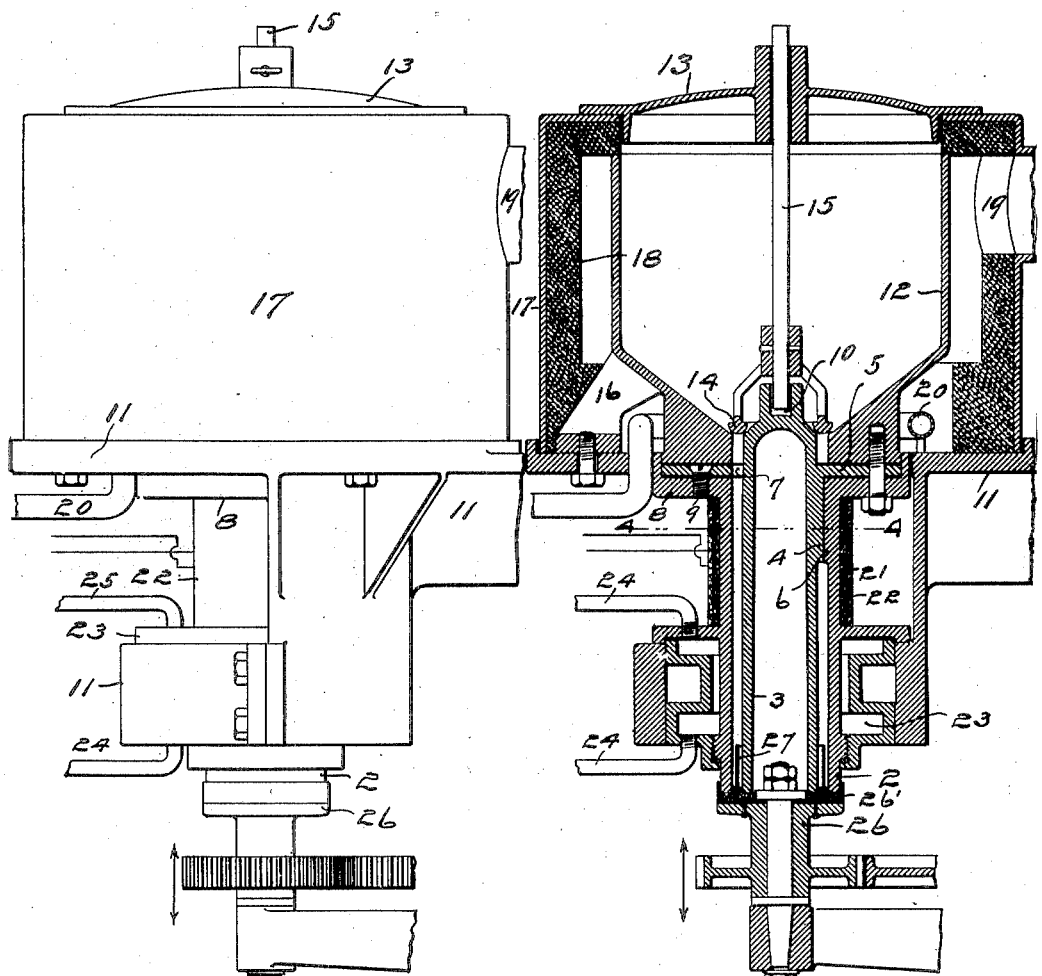
FIG. 1.
FIG. 2.
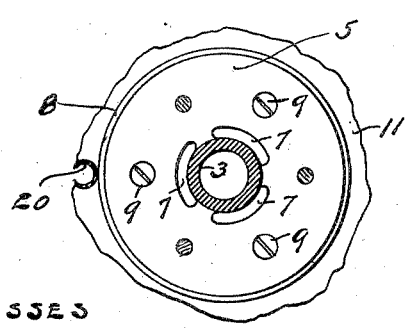
FIG. 3.
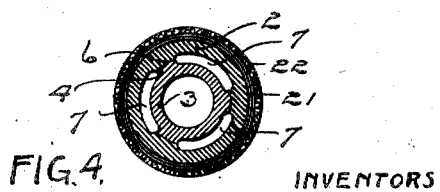
FIG. 4.
INVENTORS
CHARLES B. STRAVS
JOHN N. JAGER
BY Paul & Paul
THEIR ATTORNEYS
WITNESSES No. 777,561. PATENTED DEC. 13, 1904.
C. B. STRAVS & J. N. JAGER.
APPARATUS FOR FORMING PIPE OR OTHER ARTICLES IN CONTINUOUS LENGTHS.
APPLICATION FILED FEB. 23, 1904.

NO MODEL. 3 SHEETS—SHEET 2.

WITNESSES
P. G. Hanson
W. Hagerty

INVENTORS
CHARLES B STRAVS
JOHN N. JAGER
BY Paul & Paul
THEIR ATTORNEYS

No. 777,561. PATENTED DEC. 13, 1904.
C. B. STRAVS & J. N. JAGER.
APPARATUS FOR FORMING PIPE OR OTHER ARTICLES IN CONTINUOUS LENGTHS.
APPLICATION FILED FEB. 23, 1904.
NO MODEL. 3 SHEETS—SHEET 3.

WITNESSES
P. G. Harison
M. Hagerty

INVENTORS
CHARLES B. STRAVS
JOHN N. JAGER
BY Paul & Paul
THEIR ATTORNEYS

No. 777,561.

Patented December 13, 1904.

UNITED STATES PATENT OFFICE.

CHARLES B. STRAVS AND JOHN N. JAGER, OF MINNEAPOLIS, MINNESOTA, ASSIGNORS OF ONE-THIRD TO ANTHONY HUHN, OF MINNEAPOLIS, MINNESOTA.

APPARATUS FOR FORMING PIPE OR OTHER ARTICLES IN CONTINUOUS LENGTHS.

SPECIFICATION forming part of Letters Patent No. 777,561, dated December 13, 1904.

Application filed February 23, 1904. Serial No. 194,694. (No model.)

*To all whom it may concern:*

Be it known that we, CHARLES B. STRAVS and JOHN N. JAGER, of Minneapolis, in the county of Hennepin and State of Minnesota, have invented certain new and useful Improvements in Apparatus for Forming Pipe or other Articles in Continuous Lengths, of which the following is a specification.

This invention relates to improvements in apparatus for forming pipe, tubing, shafting, rods, or other articles in continuous lengths; and the object we have in view is to provide an apparatus for this purpose that is simple and inexpensive in construction and whereby such articles in continuous lengths can be quickly and economically produced.

The invention consists generally in the constructions and combinations hereinafter described, and particularly pointed out in the claims.

Figure 5:
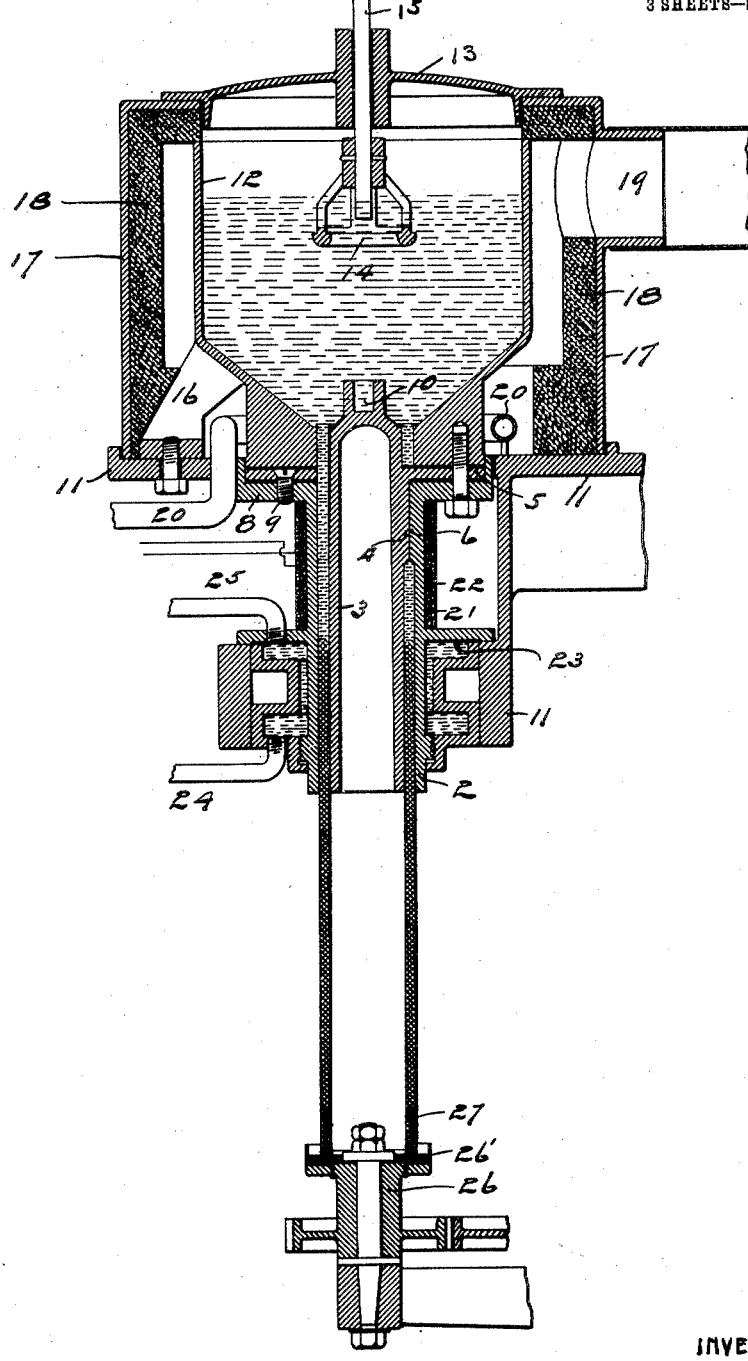
Figure 9:
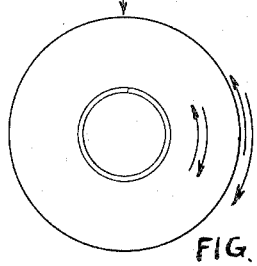
Figure 10:
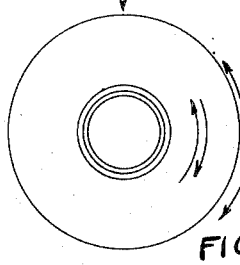
Figure 11:
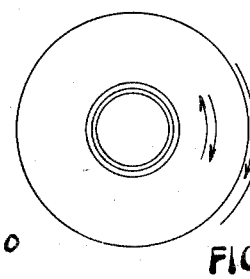

In the accompanying drawings, forming part of this specification, Figure 1 is a side elevation of an apparatus embodying our invention. Fig. 2 is a vertical section of the same. Fig. 3 is a plan of the plate supporting the central core. Fig. 4 is a section on line 4 4 of Fig. 2. Fig. 5 is a view similar to Fig. 2, but showing a pipe in the act of being formed therein. Figs. 6, 7, 8, 12, 13, and 14 illustrate certain modifications of the apparatus. Figs. 9, 10, and 11 are plan views of the devices shown in Figs. 6, 7, and 8 of the drawings, the arrows indicating that either the mold or the support may rotate in either direction.

In the drawings, 2 represents a suitable mold, preferably of circular form in cross-section. Arranged centrally within the mold is a core 3, also preferably of circular form in cross-section. The upper part of the core has a flange or plate 5 formed integrally with it, and suitable vertical lugs 4 and 6 are formed on the outer wall of the core and the inner wall of the mold. These lugs fit accurately together and form means for centering the core in the mold. Openings 7 are formed in the plate 5, and these openings register with the spaces between the lugs. The plate 5 is preferably secured to a flange 8 on the upper part of the mold 2 by suitable screws 9. The core 3 preferably projects a short distance above the plate 5 and has a recess 10 in its upper end. The mold 2 is preferably supported upon a suitable bracket 11.

Above the mold 2 and preferably supported on the bracket 11 is a melting pot or furnace 12, having preferably a conical bottom and a central opening coinciding with the inner wall of the mold. A removable cover 13 is provided for the melting-pot, and a ring valve 14 is arranged to close the opening leading into the mold. This valve is secured upon a rod 15, which extends through an opening in the cover, and the lower end of the rod is adapted to engage the opening 10 in the top of the core 3. The pot 12 is preferably provided with legs 16, by which it is supported upon the bracket 11. The pot 12 is preferably surrounded by a casing 17, having a fire-clay lining 18 and an exit-flue 19. A suitable burner 20 is arranged within the casing and surrounding the lower part of the pot 12. By this means metal placed within the pot may be melted and maintained in a molten condition. The upper part of the mold is surrounded by heating-coils 21 and a suitable covering 22, and the lower part of the mold is surrounded by a water-chamber 23, having inlet and outlet pipes 24 and 25.

Below the mold is a vertically-movable and rotatable or non-rotatable support 26. This support and the means for rotating and raising and lowering it being substantially the same as that shown and described in our application filed January 19, 1904, Serial No. 189,767, we deem it unnecessary to show in this application the means for raising and lowering and for rotating the support. The top of the support is provided with an asbestos or other suitable packing 26' and with a ring 27, that when the support is raised against the bottom of the mold projects into the annular space between the inner wall of the mold and the outer wall of the plunger. (See Fig. 2.)

The operation of the apparatus is as follows: The parts all being in the position shown in Fig. 2 and a suitable amount of molten metal being in the pot 12, the valve 14 is raised and the molten metal flows into the mold and passing down therein surrounds the ring 27, which becomes embedded in said metal. Holes may be formed in this ring to permit the metal to enter said holes, and thereby to unite the ring firmly to the metal. Water is now permitted to flow through the water-chamber surrounding the lower part of the mold, thereby cooling this part of the mold and solidifying the metal. The support is now lowered, and the solidified metal is drawn out of the mold. The metal continues to enter the mold and pass downward therein, becoming solidified before it reaches the lower end and being drawn out by the descending support. This part of the operation is clearly illustrated in Fig. 5 of the drawings. Instead of lowering the support the mold itself might be raised and lowered, while the support remained stationary. This we have indicated in Fig. 8 of the drawings. In Figs. 10 and 11 we have indicated that the mold and support, or either of them, may be rotated in either direction. Means for this purpose we have illustrated and described in our said application, Serial No. 189,767, of January 19, 1904.

Figure 6:
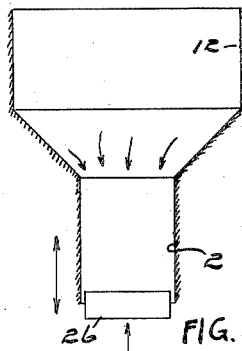
Figure 7:
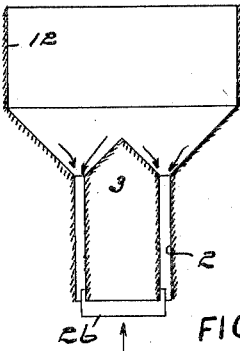
Figure 8:
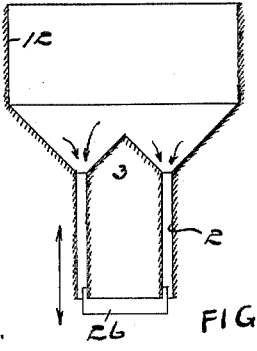

In Fig. 6 we have indicated that the core may be omitted, in which case a shaft or rod will be formed.

Figure 12:
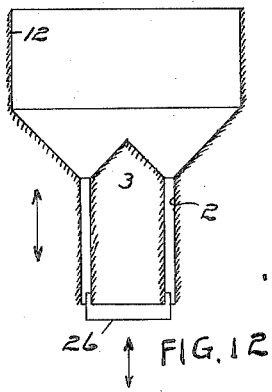

In Fig. 12 we have indicated that both the mold and the support may be raised or lowered.

Figure 13:
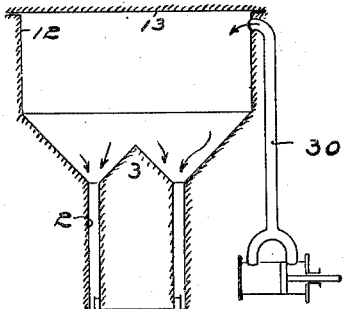

In Fig. 13 we have shown the melting-pot closed and an air-compressor 30 connected thereto for forcing the metal into the mold.

Figure 14:
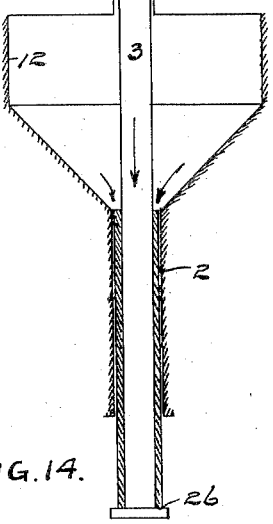

In Fig. 14 we have shown the core 3 in the form of a metal rod passing through the melting-pot and the mold and connected with the support. In this instance the core moves with the support.

In place of using a melting-pot such as herein shown and described we may use any suitable furnace for reducing the material to a molten condition.

The details of the construction may be changed in many particulars without departing from our invention.

We claim as our invention—

1. The combination, with a suitable mold, of a melting-pot arranged above said mold, means for heating material contained in said melting-pot, a core arranged within said mold, said core being provided with a flange having suitable inlet-openings, and a valve controlling the passage of molten metal from said melting-pot to said mold, substantially as described.

2. The combination, with a suitable mold of a melting-pot arranged above said mold, means for heating material contained in said melting-pot, a core arranged within said mold, said core being provided with a flange having suitable inlet-openings, an annular valve controlling the passage of molten metal from said melting-pot to said mold, a support closing the opposite side of the mold adapted to be moved to and from the mold, means for heating the upper part of the mold, and means for cooling the lower part of the mold.

3. The combination, with the mold 2, of the core 3 provided with the flange 5 and arranged within said mold, said flange being provided with suitable inlet-openings 7, the melting-pot arranged above said mold, the annular valve 14 controlling the passage of metal from said melting-pot to said mold, a support closing the opposite end of said mold and adapted to be moved to and from the mold, substantially as described.

4. The combination, with the mold 2, of the core 3 provided with the flange 5 and arranged within said mold, said flange being provided with suitable inlet-openings 7, centering-lugs arranged upon the inner surface of the mold and the outer surface of the core, an annular valve controlling the passage of metal from said melting-pot to said mold, a support closing the lower end of the mold and adapted to be moved to and from the mold and to which the metal in the mold becomes united, whereby when said support is moved away the solidified metal is drawn out of the mold, and means for supplying molten metal to said mold, substantially as described.

5. The combination, with the mold, means for supplying molten metal to said mold, a core arranged within said mold and an annular valve controlling the passage of metal to said mold, of a support arranged to close the exit end of the mold and adapted to be moved to and from the mold, a cooling-chamber surrounding said mold near the exit-opening and a series of heating-coils surrounding said mold near the inlet-opening, substantially as described.

6. The combination, with the mold 2 provided with an inlet-opening at one end and an outlet-opening at the other, a core arranged within said mold and an annular valve controlling the passage of metal to said mold, of a movable support arranged to close the outlet-opening, of the mold, means for supplying molten metal to the mold through its inlet-opening, a cooling-chamber surrounding the mold near the outlet-opening, and a series of heating-coils surrounding the mold near the inlet-opening, substantially as described.

In witness whereof we have hereunto set our hands this 16th day of February, 1904.

CHARLES B. STRAVS.
JOHN N. JAGER.

In presence of—
C. G. HANSON,
A. C. PAUL.